United States Patent
Moshayedi et al.

(10) Patent No.: US 8,473,672 B2
(45) Date of Patent: *Jun. 25, 2013

(54) SYSTEM AND METHOD FOR STORING DATA USING A FLEXIBLE DATA FORMAT

(71) Applicant: STEC, Inc., Santa Ana, CA (US)

(72) Inventors: Mark Moshayedi, Newport Coast, CA (US); Seyed Jalal Sadr, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,184

(22) Filed: Dec. 18, 2012

(65) Prior Publication Data

US 2013/0111118 A1    May 2, 2013

Related U.S. Application Data

(63) Continuation of application No. 12/511,991, filed on Jul. 29, 2009.

(51) Int. Cl.
*G06F 12/02* (2006.01)
*G06F 12/06* (2006.01)

(52) U.S. Cl.
USPC ............ 711/103; 711/154; 711/170; 711/171

(58) Field of Classification Search
USPC .................. 711/103, 154, 170, 171
See application file for complete search history.

(56) References Cited

U.S. PATENT DOCUMENTS

| | | |
|---|---|---|
| 5,459,850 A | 10/1995 | Clay et al. |
| 5,793,676 A | 8/1998 | Bedarida et al. |
| 5,822,781 A | 10/1998 | Wells et al. |
| 5,930,826 A | 7/1999 | Lee et al. |
| 6,401,164 B1 | 6/2002 | Bartoli et al. |
| 6,463,516 B1 | 10/2002 | Leong et al. |
| 6,490,649 B2 | 12/2002 | Sinclair |
| 6,591,327 B1 | 7/2003 | Briner et al. |
| 7,921,178 B2 * | 4/2011 | Haviv ..................... 709/212 |
| 7,949,819 B2 | 5/2011 | Kang et al. |
| 8,055,842 B1 | 11/2011 | Iyer |
| 2005/0021904 A1 | 1/2005 | Iaculo et al. |
| 2005/0182896 A1 | 8/2005 | Song |
| 2006/0156189 A1 | 7/2006 | Tomlin |
| 2006/0248267 A1 | 11/2006 | Xie |
| 2009/0150597 A1 | 6/2009 | Yang et al. |
| 2010/0042901 A1 | 2/2010 | Moshayedi et al. |
| 2010/0115225 A1 | 5/2010 | Kim et al. |
| 2011/0072232 A1 | 3/2011 | Watanabe et al. |

OTHER PUBLICATIONS

T. Kgil, et al., "Improving NAND Flash Based Disk Caches", International Symposium on Computer Architecture, IEEE, 2008, pp. 327-338.

* cited by examiner

*Primary Examiner* — John Lane
(74) *Attorney, Agent, or Firm* — McDermott Will & Emery LLP

(57) ABSTRACT

A flash storage device includes a flash storage for storing data and a controller for receiving a command in connection with user data and selecting a sector size associated with storing the user data. The controller allocates the user data among data sectors having the sector size and writes the data sectors to the flash storage. In some embodiments, the controller generates system data and stores the system data in the data sectors or a system sector, or both.

24 Claims, 6 Drawing Sheets

SYSTEM AND METHOD FOR STORING DATA USING A FLEXIBLE DATA FORMAT

CROSS-REFERENCES TO RELATED APPLICATIONS

This application is a continuation of U.S. application Ser. No. 12/511,991, entitled FLASH STORAGE DEVICE WITH FLEXIBLE DATA FORMAT and filed Jul. 29, 2009, the subject matter of which is incorporated herein by reference in its entirety.

TECHNICAL FIELD

The present invention generally relates to flash storage devices, and more particularly to systems and methods of storing data in a flash storage device.

BACKGROUND

Flash storage devices are increasing used for storing data in electronic applications. In many such applications, the flash storage device stores data in a storage block of a flash storage by partitioning data among sectors having the same fixed size and writing the sectors to the storage block. To maximize data storage capacity of the flash storage device, the flash storage is selected so that the block size of the flash storage is an integer multiple of the fixed sector size of the flash storage device.

In some applications, data for a particular software program is organized in a data size that is less than the fixed sector size of the flash storage device. In these applications, one or more bits of each sector are not used to store useful data. For example, higher order bits of each sector may be set to a value of zero. Consequently, the data storage capacity of the flash storage device is reduced for the particular application.

In light of the above, a need exists for a flash storage device that efficiently stores data of different data sizes.

SUMMARY

In various aspects, a system for storing data in a flash storage device comprises a flash storage and a controller. The controller may be configured to receive a command comprising in connection with user data, select a sector size, allocate the user data among a plurality of data sectors of the sector size, and write one or more pages of data comprising the data sectors to the flash storage. The controller may be further configured to read data from the flash storage, allocate the data among one or more data sectors of the sector size, and provide the data sectors to a host system.

In this way, the flash storage device efficiently stores the data in the flash storage device. Moreover, the flash storage device is capable of selecting the sector size to maximize the data storage capacity of the flash storage device. In a further embodiment, the controller generates system data and stores the system data in the data sectors or a system sector, or both.

In another aspect, a system for storing data in a flash storage device may comprise a flash storage and a controller. In this aspect, the controller may be configured to receive a command comprising data, select a sector size, allocate the data among one or more sectors of the sector size, generate system data for the one or more sectors, wherein the system data is allocated among the one or more sectors of the sector size, and write the one or more sectors to one or more storage blocks of the flash storage.

In a further aspect, a method for writing data to a flash storage device comprises receiving a command in connection with user data, selecting, in response to the command, a first sector size for an allocation of the user data, allocating the user data among a plurality of data sectors of the first sector size, and writing one or more pages of data comprising the plurality of data sectors to the flash storage device.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION

In various embodiments, a flash storage device receives a command from a host, selects a sector size, and transfers data between the host and the flash storage device according to the sector size.

Figure 1:
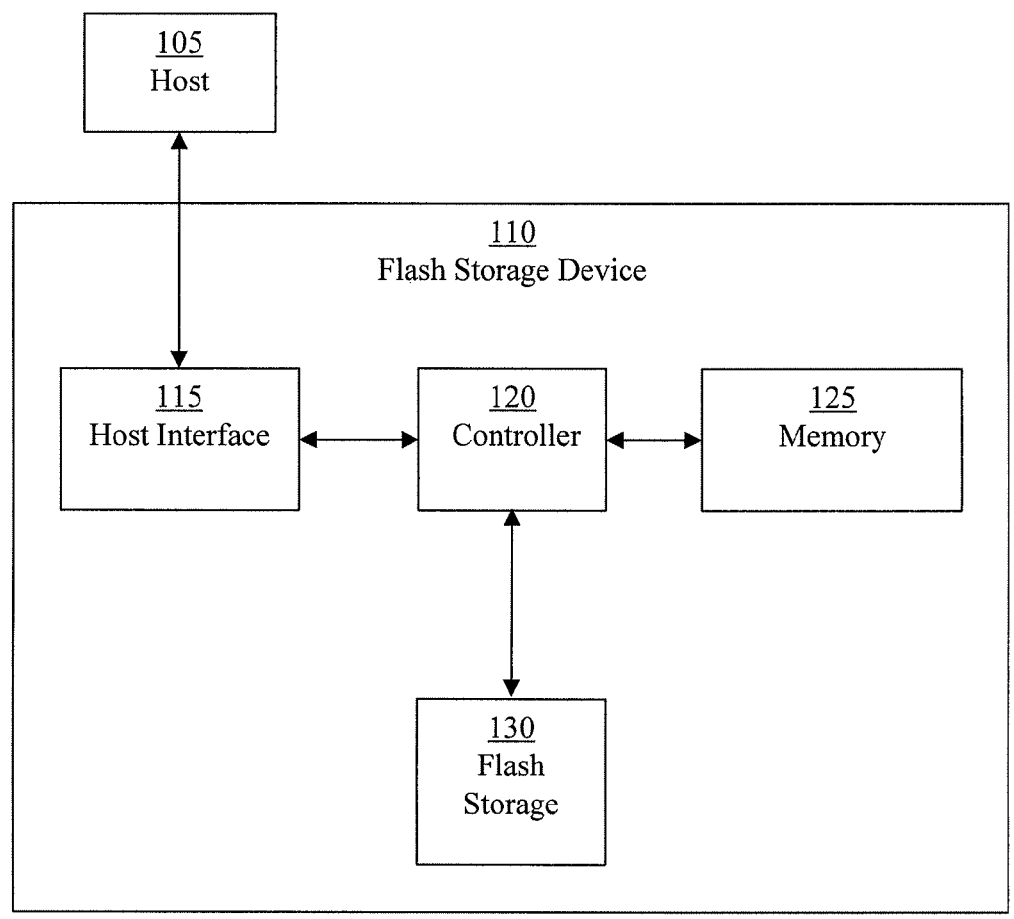
FIG. 1 is a block diagram of an electronic system, in accordance with an embodiment of the present invention.

FIG. 1 illustrates an electronic system 100, in accordance with an embodiment of the present invention. The electronic system 100 includes a host 105 and a flash storage device 110 coupled to the host 105. The host 105 provides commands to the flash storage device 110 for transferring data between the host 105 and the flash storage device 110. For example, the host 105 may provide a write command to the flash storage device 110 for writing data to the flash storage device 110 or read command to the flash storage device 110 for reading data from the flash storage device 110. The host 105 may be any system or device having a need for data storage or retrieval and a compatible interface for communicating with the flash storage device 110. For example, the host 105 may a computing device, a personal computer, a portable computer, or workstation, a server, a personal digital assistant, a digital camera, a digital phone, or the like.

The flash storage device 110 includes a host interface 115, a controller 120, a memory 125, and a flash storage 130. The host interface 115 is coupled to the controller 120 and facilitates communication between the host 105 and the controller 120. Additionally, the controller 120 is coupled to the memory 125 and the flash storage 130. The host interface 115 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 105 includes the flash storage device 110. In other embodiments, the flash storage device 110 is remote with respect to the host 105 or is contained in a remote computing system coupled in communication with the host 105. For example, the host 105 may communicate with the flash storage device 110 through a wireless communication link.

The controller 120 controls operation of the flash storage device 110. In various embodiments, the controller 120 receives commands from the host 105 through the host interface 115 and performs the commands to transfer data between the host 105 and the flash storage 130. The controller 120 may include any type of processing device, such as a microprocessor, a microcontroller, an embedded controller, a logic circuit, software, firmware, or the like, for controlling operation of the flash storage device 110. Additionally, the controller 120 selects a sector size for transferring data between the controller 120 and the flash storage 130, as is described more fully herein.

In some embodiments, some or all of the functions described herein as being performed by the controller 120 may instead be performed by another element of the flash storage device 110. For example, the flash storage device 110 may include a microprocessor, a microcontroller, an embedded controller, a logic circuit, software, firmware, or any kind of processing device, for performing one or more of the functions described herein as being performed by the controller 120. In some embodiments, one or more of the functions described herein as being performed by the controller 120 are instead performed by the host 105.

The memory 125 may be any memory, computing device, or system capable of storing data. For example, the memory 125 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 120 uses the memory 125, or a portion thereof, to store data during the transfer of data between the host 105 and the flash storage 130. For example, the memory 125 or a portion of the memory 125 may be a cache memory.

The flash storage 130 receives data from the controller 120 and stores the data. The flash storage 130 may be any type of flash storage, such as a flash storage system, a solid-state drive, a flash memory card, a secure digital (SD) card, a universal serial bus (USB) memory device, a CompactFlash card, a SmartMedia device, a flash storage array, or the like.

Figure 2:
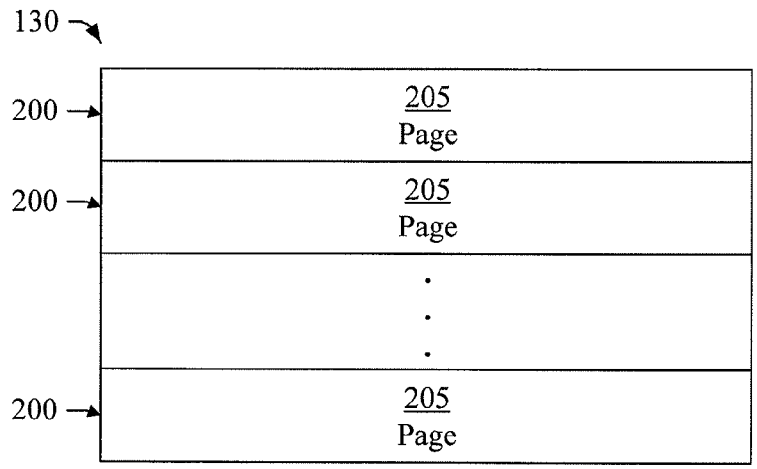
FIG. 2 is a block diagram of a flash storage, in accordance with an embodiment of the present invention.

FIG. 2 illustrates the flash storage 130, in accordance with an embodiment of the present invention. The flash storage 130 includes storage blocks 200, each of which has a block size. The block size of the storage blocks 200 may be any number of data bits or data bytes. In some embodiments, the block size of the storage blocks 200 is a number of data bits having power of two. For example, the block size of the storage blocks 200 may be sixty-four data bits, one-hundred-twenty-eight data bits, two-hundred-fifty-six data bits, five-hundred-twelve data bits, one-thousand-twenty-four data bits, two-thousand-forty-eight data bits, four-thousand-ninety-six data bits, or the like. In one embodiment, the block size of the storage blocks 200 is four-thousand-three-hundred-fourteen data bits.

Each storage block 200 is capable of storing a page 205 of data (e.g., a data page). Moreover, the page 205 has a page size which is equal to, or less than, the block size of the storage block 200. In various embodiments, the block size of the storage block 200 is the same as the page size of the page 205. For example, the block size and the page size may be four-thousand-three-hundred-fourteen data bits.

Figure 3:
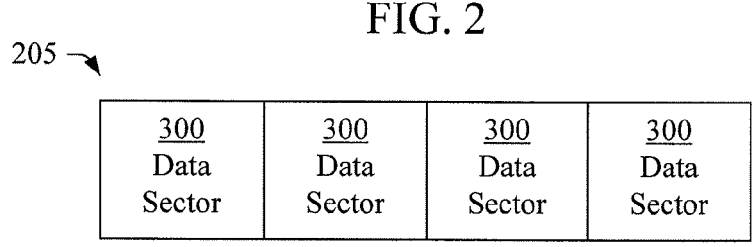
FIG. 3 is a block diagram of a page, in accordance with an embodiment of the present invention.

FIG. 3 illustrates the page 205, in accordance with an embodiment of the present invention. As illustrated, the page 205 includes one or more data sectors 300. Moreover, the page 205 has a page size. In various embodiments, the controller 120 receives a write command including data and selects a sector size such that the page size of the page 205 is an integer multiple of the sector size. Further, the controller 120 allocates the data of the command among the data sectors 300 and writes the data sectors 300 to the flash storage 130. In further embodiments, the controller 120 receives a read command from the host 105 through the host interface 115, reads data from the flash storage 130 based on the read command, assembles a page 205 containing the data or portions thereof, and provides the page 205 to the host 105 through the host interface 115.

In some embodiments, the controller 120 writes the data sectors 300 to the memory 125 before writing the data sectors 300 to the flash storage 130. In this way, the controller 120 may reduce the number of write operations performed on the flash storage 130. For example, the controller 120 may allocate data of more than one command to data sectors 300, write the data sectors 300 to the memory 125, and then transfer the data sectors 300 from the memory 125 to the flash storage 130 at the same time. In one embodiment, the memory 125 or a portion thereof functions as a cache memory, and the controller 120 writes data to, and reads data from, the cache memory.

In some embodiments, the controller 120 allocates the data of the command among the data sectors 300 of the page 205 such that each data sector 300 includes a remaining portion that does not contain data of the command. In these embodiments, the controller 120 generates other data (e.g., system data) and allocates the other data among the remaining portions of the data sectors 300. For example, the other data may include an error correction code for each data sector 300, a logical block address of a storage block 200 storing the data sectors 300, a time stamp for each data sector 300 indicating a time the data sector 300 is written to the flash storage 130, or some combination thereof. The controller 120 writes the page 205 containing the data sectors 300 and the other data to one or more storage blocks 200 of the flash storage 130.

In other embodiments, the controller 120 selects a sector size such that the page size of the page 205 is greater than an integer multiple of the sector size. The controller 120 allocates the data of the command among the data sectors 300 and writes the data sectors 300 to the flash storage 130. Additionally, the controller 120 generates other data (e.g., system data)

for the data sectors 300 and writes the other data to the flash storage 130. In one embodiment, the controller 120 allocates the other data to a remaining portion of the page 205 not containing any data sector 300. In another embodiment, the controller 120 allocates a portion of the other data to each data sector 300 and a portion of the other data to a remaining portion of the page 205 not containing any data sector 300.

Although four data sectors 300 are illustrated in FIG. 3, the controller 120 may allocate the data to one sector, two sectors, three sectors, or four sectors. In other embodiments, the controller 120 may allocate data to more than four data sectors or more than one page 205. Further, the controller 120 may write the data sectors 300 to the flash storage 130 one at a time or may write more than one data sector 300 to the flash storage 130 at the same time. In one embodiment, the controller 120 selects the sector size based on the write command. In another embodiment, the controller 120 selects the sector size based on an input to the flash storage device 110. For example, the controller 120 may select the sector size based on a user input.

In some embodiments, the controller 120 receives a write command including data from the host 105 through the host interface 115, selects a sector size, allocates the data among data sectors 300 having the sector size, and writes the data sectors 300 to the flash storage 130. In various embodiments, the controller 120 may write the data sectors 300 to the flash storage 130 one at a time or may write more than one data sector 300 to the flash storage 130 at the same time. In one embodiment, the controller 120 selects the sector size based on the write command. In another embodiment, the controller 120 selects the sector size based on an input to the flash storage device 110. For example, the controller 120 may select the sector size based on a user input. In further embodiments, the controller 120 receives a read command from the host 105 through the host interface 115, reads data from the flash storage 130 based on the read command, allocates the data among one or more data sectors 300, and provides the data sectors 300 to the host 105 through the host interface 115. For example, the controller 120 may provide a page 205 containing the data sectors 300 to the host 105.

In some embodiments, the controller 120 allocates data of the command among the data sectors 300 and generates other data (e.g., system data) based on the data sectors 300. For example, the other data may include an error correction code for each data sector 300, a logical block address of a storage block 200 storing the data sectors 300, a time stamp for each data sector 300 indicating a time the data sector 300 is written to the flash storage 130, or some combination thereof. The controller 120 writes the data sectors 300 and the other data to one or more storage blocks 200 of the flash storage 130. In another embodiment, the controller 120 allocates the other data among the data sectors 300 and writes the data sectors 300 to one or more storage blocks 200 of the flash storage 130. In still another embodiment, the controller 120 allocates a portion of the other data among the data sectors 300. Further, the controller 120 writes the data sectors 300 and the remaining portion of the other data to one or more storage blocks 200 of the flash storage 130.

Figure 4:
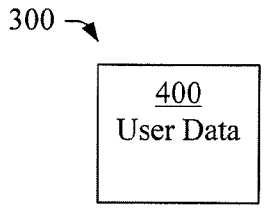
FIG. 4 is a block diagram of a data sector, in accordance with an embodiment of the present invention.

FIG. 4 illustrates the data sector 300, in accordance with an embodiment of the present invention. As illustrated, the data sector 300 includes user data 400. In various embodiments, the controller 120 selects the sector size of the data sector 300, receives a write command including data, and allocates the data, or a portion thereof, to the data sector 300 as user data 400. Additionally, the controller 120 writes the data sector containing the user data 400 to the flash storage 130.

Figure 5:
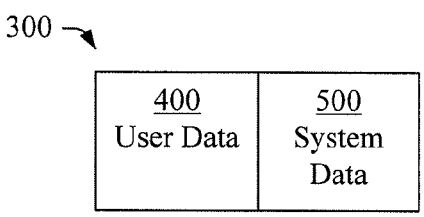
FIG. 5 is a block diagram of a data sector, in accordance with an embodiment of the present invention.

FIG. 5 illustrates the data sector 300, in accordance with an embodiment of the present invention. The data sector 300 includes user data 400 and system data 500. In various embodiments, the controller 120 selects the sector size of the data sector 300, receives a write command including data, and allocates the data, or a portion thereof, to the data sector 300 as user data 400. Additionally, the controller 120 generates the system data 500 and allocates the system data 500 to the data sector 300. For example, the system data 500 may include an error correction code for the user data 400, a logical block address of a storage block 200 for storing the user data 400, a time stamp for the user data 400, or some combination thereof. The controller 120 writes the data sector 300 containing the user data 400 and the system data 500 to the flash storage 130.

Figure 6:
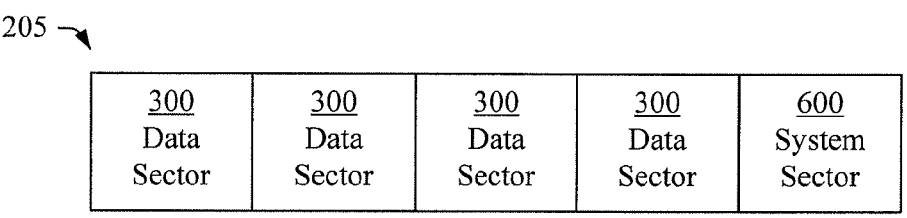
FIG. 6 is a block diagram of a page, in accordance with an embodiment of the present invention.

FIG. 6 illustrates the page 205, in accordance with an embodiment of the present invention. The page 205 includes four data sectors 300 and a system sector 600. In various embodiments, the controller 120 selects a sector size of the data sectors 300 and a sector size of the system sector 600 such that a page size of the page 205 is the same as a block size of a storage block 200. Although four data sectors 300 are illustrated in FIG. 6, the page 205 may have more or fewer than four data sectors 300 in other embodiments.

In one embodiment, the controller 205 writes the page 205 into multiple storage blocks 200. In this embodiment, the controller 205 writes one or more of the data sectors 300 of the page 205 to a first storage block 200 and writes the remaining data sectors 300 of the page 205 to a next storage block 200. In one embodiment, the page 205 includes seven data sectors 300, and the storage block 200 is capable of storing four data sectors 300. In this embodiment, the controller 205 writes four data sectors 300 of the page 205 to a first storage block 200 and writes the remaining three data sectors 300 of the page 205 to a second storage block 200 (e.g., the next consecutive storage block 200 in the flash storage 130). In some embodiments, the controller 120 writes the first data sector 300 of the page 205 to the first storage block 200 at an offset. For example, the offset may be sixteen bits from a start of the storage block 200. Moreover, the controller 120 may select the offset to maximize storage capacity of the flash storage 130, for example by packing the data sectors 300 of pages 205 next to each other so that no bits of the storage block 200 are unused. In these embodiments, a portion of a data sector 300 may be written to one storage block 200 and a remaining portion of the data sector 300 may be written to another storage block 200.

Figure 7:
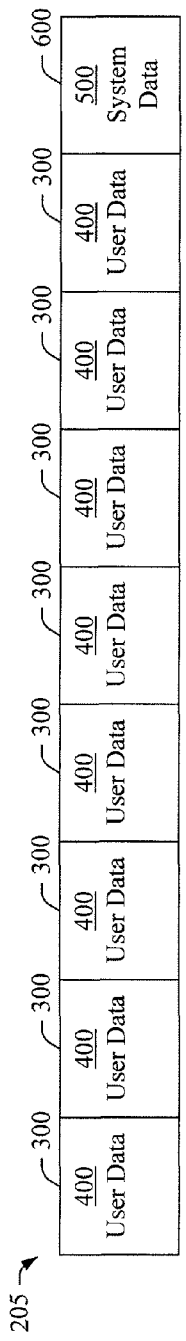
FIG. 7 is a block diagram of a page, in accordance with an embodiment of the present invention.

FIG. 7 illustrates the page 205, in accordance with an embodiment of the present invention. The page 205 includes eight data sectors 300 and a system sector 600. In various embodiments, the controller 120 selects a sector size of the data sectors 300 and a sector size of the system sector 600 such that a page size of the page 205 is the same as a block size of a storage block 200. The controller 120 receives a write command including data, and allocates the data, or a portion thereof, to each data sector 300 as user data 400. Additionally, the controller 120 generates system data 500 and allocates the system data 500 to the system sector 600. For example, the system data 500 may include an error correction code for the page 205, an error correction code for the user data 400 in each data sector 300, a logical block address of a storage block 200 for storing the page 205, logical block addresses for storing each data sector 300, a time stamp for each data sector 300, or some combination thereof.

The controller 120 writes the data sectors 300 and the system sector 600 to the flash storage 130. For example, the controller 120 may write the page 205 containing the data sectors 300 and the system sector 600 to the flash storage 130. Although eight data sectors 300 are illustrated in FIG. 6, the page 205 may have more or fewer than eight data sectors 300 in other embodiments. In some embodiments, each storage block 200 of the flash storage 130 includes an out-of-bounds (OOB) area and the controller 120 writes the system sector 600 to the out-of-bounds area.

In one embodiment, the block size of the storage block 200 is four-thousand-three-hundred-fourteen bits. In this embodiment, the controller 120 selects the sector size of the data sectors 300 such that the page 205 includes eight data sectors 300 and one system sector 600. For example, the controller 120 may select the sector size of the data sectors 300 to be five-hundred-twenty-bits and select the sector size of the system sector 600 to be one-hundred-fifty-four bits. As another example, the controller 120 may select the sector size of the data sectors 300 to be five-hundred-twenty-four-bits and select the sector size of the system sector 600 to be one-hundred-twenty-two bits. As still another example, the controller 120 may select the sector size of the data sectors 300 to be five-hundred-twenty-eight bits and select the sector size of the system sector 600 to be ninety bits. In various embodiments, the controller 120 selects the sector size of the data sectors 300 and the sector size of the system sector 600 based on a data format of an application program. In this way, the controller 120 maximizes the storage capacity of the flash storage 130.

Figure 8:
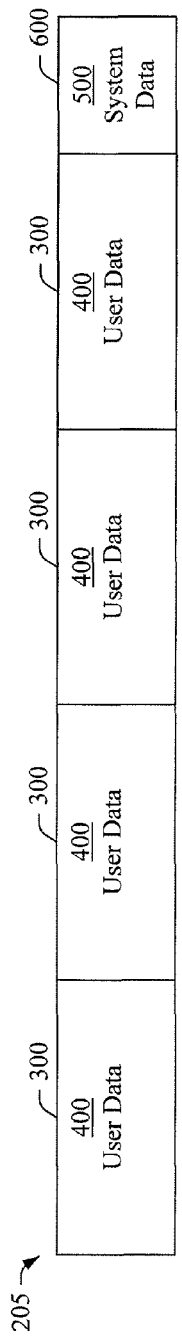
FIG. 8 is a block diagram of a page, in accordance with an embodiment of the present invention.

FIG. 8 illustrates the page 205, in accordance with an embodiment of the present invention. The page 205 includes four data sectors 300 and a system sector 600. In this embodiment, the controller 120 selects a sector size of the data sectors 300 and a sector size of the system sector 600 such that a page size of the page 205 is the same as a block size of the storage block 200. Although four data sectors 300 are illustrated in FIG. 8, the page 205 may have more or fewer than four data sectors 300 in other embodiments. In some embodiments, each storage block 200 of the flash storage 130 includes an out-of-bounds (OOB) area and the controller 120 writes the system sector 600 to the out-of-bounds area.

Figure 9:
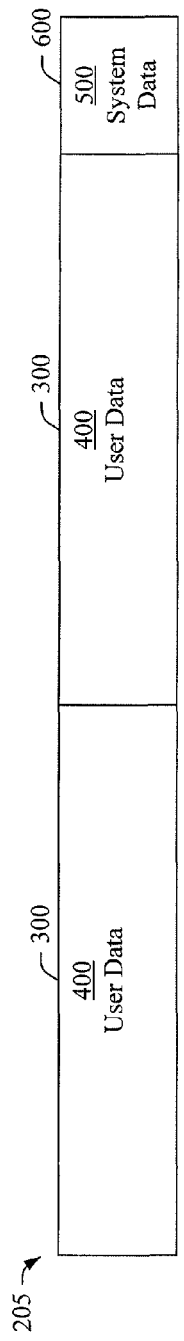
FIG. 9 is a block diagram of a page, in accordance with an embodiment of the present invention.

FIG. 9 illustrates the page 205, in accordance with an embodiment of the present invention. The page 205 includes two data sectors 300 and a system sector 600. In this embodiment, the controller 120 selects a sector size of the data sectors 300 and a sector size of the system sector 600 such that a page size of the page 205 is the same as a block size of the storage block 200. Although two data sectors 300 are illustrated in FIG. 9, the page 205 may have more or fewer than two data sectors 300 in other embodiments. In some embodiments, each storage block 200 of the flash storage 130 includes an out-of-bounds (OOB) area and the controller 120 writes the system sector 600 to the out-of-bounds area.

Figure 10:
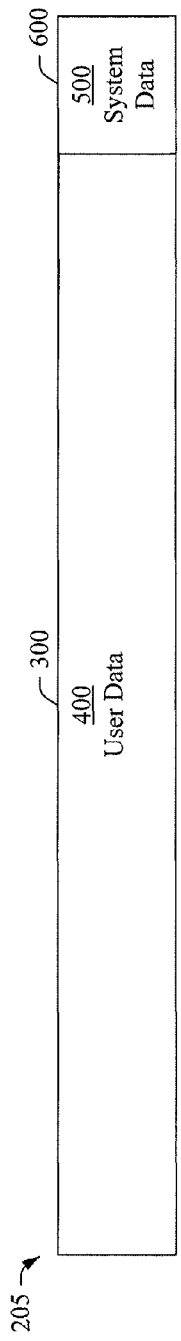
FIG. 10 is a block diagram of a page, in accordance with an embodiment of the present invention.

FIG. 10 illustrates the page 205, in accordance with an embodiment of the present invention. The page 205 includes a data sector 300 and a system sector 600. In this embodiment, the controller 120 selects a sector size of the data sector 300 such that a page size of the page 205 is the same as a block size of the storage block 200. Although one data sector 300 is illustrated in FIG. 10, the page 205 may have more than one data sector 300 in other embodiments. In some embodiments, each storage block 200 of the flash storage 130 includes an out-of-bounds (OOB) area and the controller 120 writes the system sector 600 to the out-of-bounds area.

Figure 11:
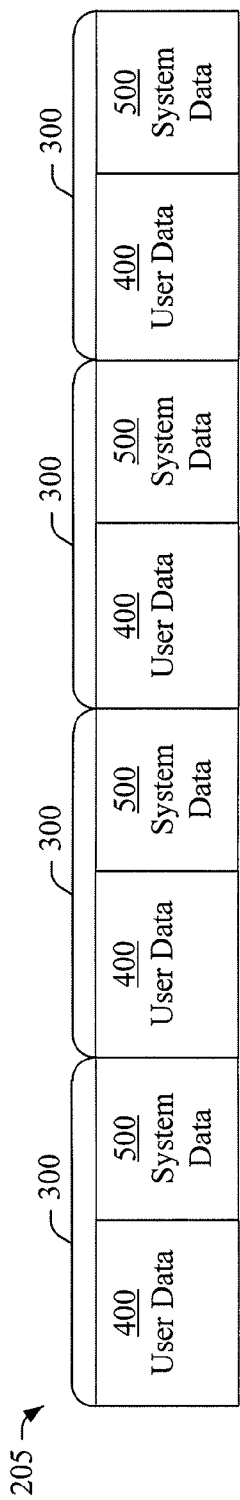
FIG. 11 is a block diagram of a page, in accordance with an embodiment of the present invention.
Figure 12:
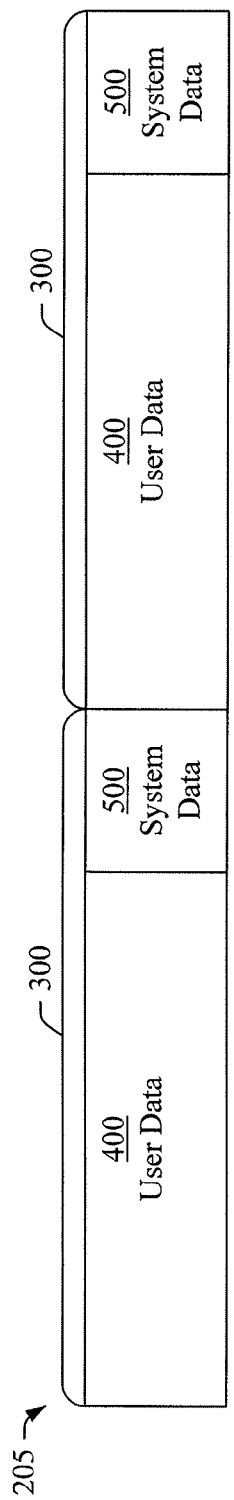
FIG. 12 is a block diagram of a page, in accordance with an embodiment of the present invention.

FIG. 11 illustrates the page 205, in accordance with an embodiment of the present invention. The page 205 includes four data sectors 300. The controller 120 receives a write command including data, and allocates the data, or a portion thereof, to each data sector 300 as user data 400. Additionally, the controller 120 generates system data 500 and allocates the system data 500 among the data sectors 300. As illustrated in FIG. 12, each data sector 300 includes user data 400 and system data 500. For example, the system data 500 of a data sector 300 may include an error correction code for the user data 400 of the data sector 300, a logical block address for storing the user data 400 in a storage block 200, a time stamp for the data sector 300, or some combination thereof. The controller 120 writes the data sectors 300 to the flash storage 130 based on the write command. Although four data sectors 300 are illustrated in FIG. 11, the page 205 may have more or fewer than four data sectors 300 in other embodiments.

In one embodiment, the controller 205 writes the page 205 into multiple storage blocks 200. In this embodiment, the controller 205 writes one or more of the data sectors 300 of the page 205 to a first storage block 200 and writes the remaining data sectors 300 of the page 205 to a next storage block 200. In one embodiment, the page 205 includes seven data sectors 300, and the storage block 200 is capable of storing four data sectors 300. In this embodiment, the controller 205 writes four data sectors 300 of the page 205 to a first storage block 200 and writes the remaining three data sectors 300 of the page 205 to a second storage block 200 (e.g., the next consecutive storage block 200 in the flash storage 130). In some embodiments, the controller 120 writes the first data sector 300 of the page 205 to the first storage block 200 at an offset. For example, the offset may be sixteen bits from a start of the storage block 200. Moreover, the controller 120 may select the offset to maximize storage capacity of the flash storage 130, for example by packing the data sectors 300 of pages 205 next to each other so that no bits of the storage block 200 are unused. In these embodiments, a portion of a data sector 300 may be written to one storage block 200 and a remaining portion of the data sector 300 may be written to another storage block 200.

FIG. 12 illustrates the page 205, in accordance with an embodiment of the present invention. The page 205 includes two data sectors 300. In various embodiments, the controller 120 selects a sector size of the data sectors 300 such that a page size of the page 205 is the same as a block size of the storage block 200. As illustrated in FIG. 12, each data sector 300 includes user data 400 and system data 500. Although two data sectors 300 are illustrated in FIG. 12, the page 205 may have more or fewer than two data sectors 300 in other embodiments.

Figure 13:
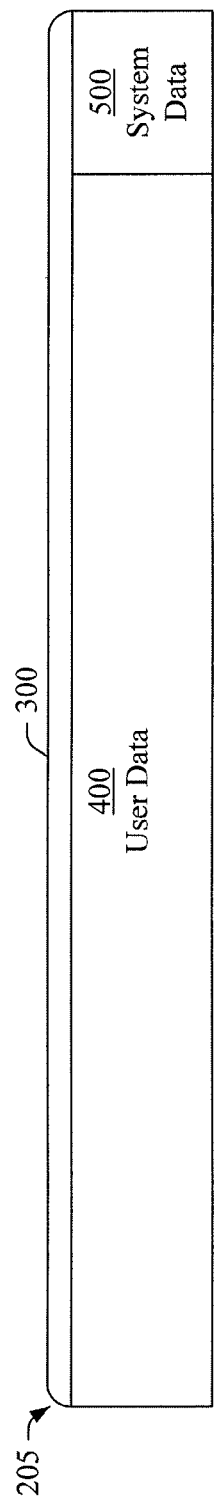
FIG. 13 is a block diagram of a page, in accordance with an embodiment of the present invention.

FIG. 13 illustrates the page 205, in accordance with an embodiment of the present invention. The page 205 includes a data sector 300 and a system sector 600. In this embodiment, the controller 120 selects a sector size of the data sector 300 and a sector size of the system sector 600 such that the page size of the page 205 is the same as the block size of the storage block 200. As illustrated in FIG. 13, the data sector 300 includes user data 400 and system data 500. Although one data sector 300 is illustrated in FIG. 13, the page 205 may have more or fewer than one data sector 300 in other embodiments.

Figure 14:
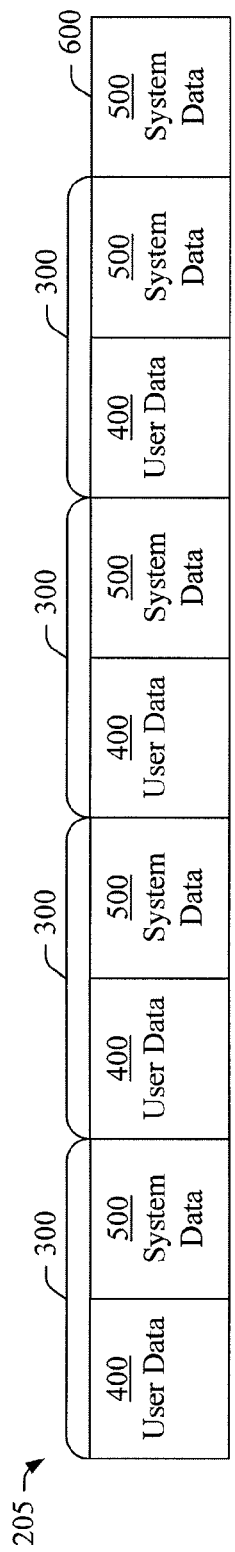
FIG. 14 is a block diagram of a page, in accordance with an embodiment of the present invention.

FIG. 14 illustrates the page 205, in accordance with an embodiment of the present invention. The page 205 includes four data sectors 300 and a system sector 600. In this embodiment, the controller 120 selects a sector size of the data sector 300 and a sector size of the system sector 600 such that a page size of the page 205 is the same as a block size of the storage block 200. The controller 120 receives a write command including data, and allocates the data, or a portion thereof, to each data sector 300 as user data 400. Additionally, the controller 120 generates system data 500 for each data sector 300 and allocates the system data 500 to that data sector 300. The controller 120 also generates system data 500 for the system sector 600 and allocates the system data 500 to the system sector 600. For example, the system data 500 may be an error correction code for the user data 400, a logical block address of a storage block 200 for storing the user data 400, a time stamp for the user data 400, or some combination thereof. The controller 120 writes the data sectors 300 and the system sector 600 to the flash storage 130. Although eight data sectors 300 are illustrated in FIG. 14, the page 205 may have more or fewer than eight data sectors 300 in other embodiments.

In one embodiment, the system data 500 in each data sector 300 includes an error correction code for the user data 400 in that data sector 300 and the system data 500 in the system sector 600 includes a logical block address of the page 205. In this embodiment, the controller 120 generates the error correction code for each data sector 300 based on the user data 400 in that data sector 300. Further, the controller 120 generates the logical block address based on a write command received from the host 105 through the host interface 115.

In another embodiment, the system data 500 in each data sector 300 includes a logical block address for the user data 400 in that data sector 300 and the system data 500 in the system sector 600 includes an error correction code of the page 205. In this embodiment, the controller 120 generates the error correction code for the page 205 based on the user data 400 in data sectors 300. Further, the controller 120 generates the logical block address based on a write command received from the host 105 through the host interface 115. In another embodiment, the controller 120 generates an error correction code for the user data 400 in each data sector 300 and the system data 500 in the system sector 600 includes the error correction codes. In other embodiments, the system data 500 in the data sectors 300 or the system sector 600 may include a time stamp for the data sectors 300.

Figure 15:
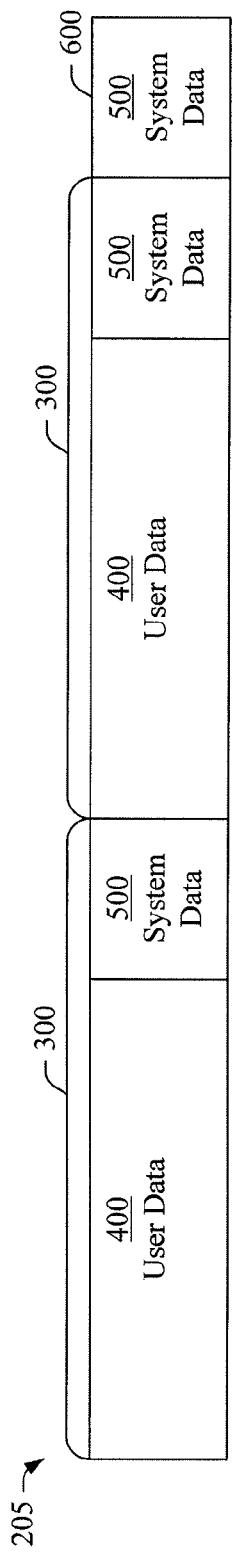
FIG. 15 is a block diagram of a page, in accordance with an embodiment of the present invention.

FIG. 15 illustrates the page 205, in accordance with an embodiment of the present invention. The page 205 includes two data sectors 300 and a system sector 600. As illustrated in FIG. 15, each data sector 300 includes user data 400 and system data 500. Additionally, the system sector 600 includes system data 500. Although two data sectors 300 are illustrated in FIG. 15, the page 205 may have more or fewer than two data sectors 300 in other embodiments.

Figure 16:
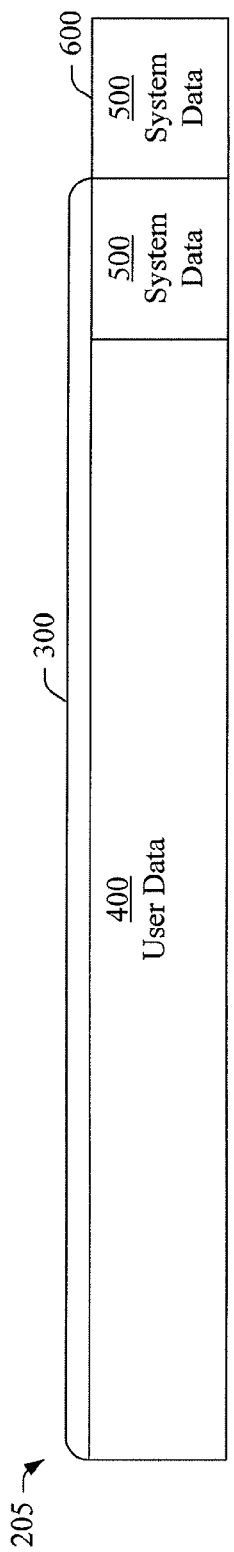
FIG. 16 is a block diagram of a page, in accordance with an embodiment of the present invention.

FIG. 16 illustrates the page 205, in accordance with an embodiment of the present invention. The page 205 includes a data sector 300 and a system sector 600. As illustrated in FIG. 15, the data sector 300 includes user data 400 and system data 500. Additionally, the system sector 600 includes system data 500. Although one data sector 300 is illustrated in FIG. 16, the page 205 may have more than one data sector 300 in other embodiments.

Figure 17:
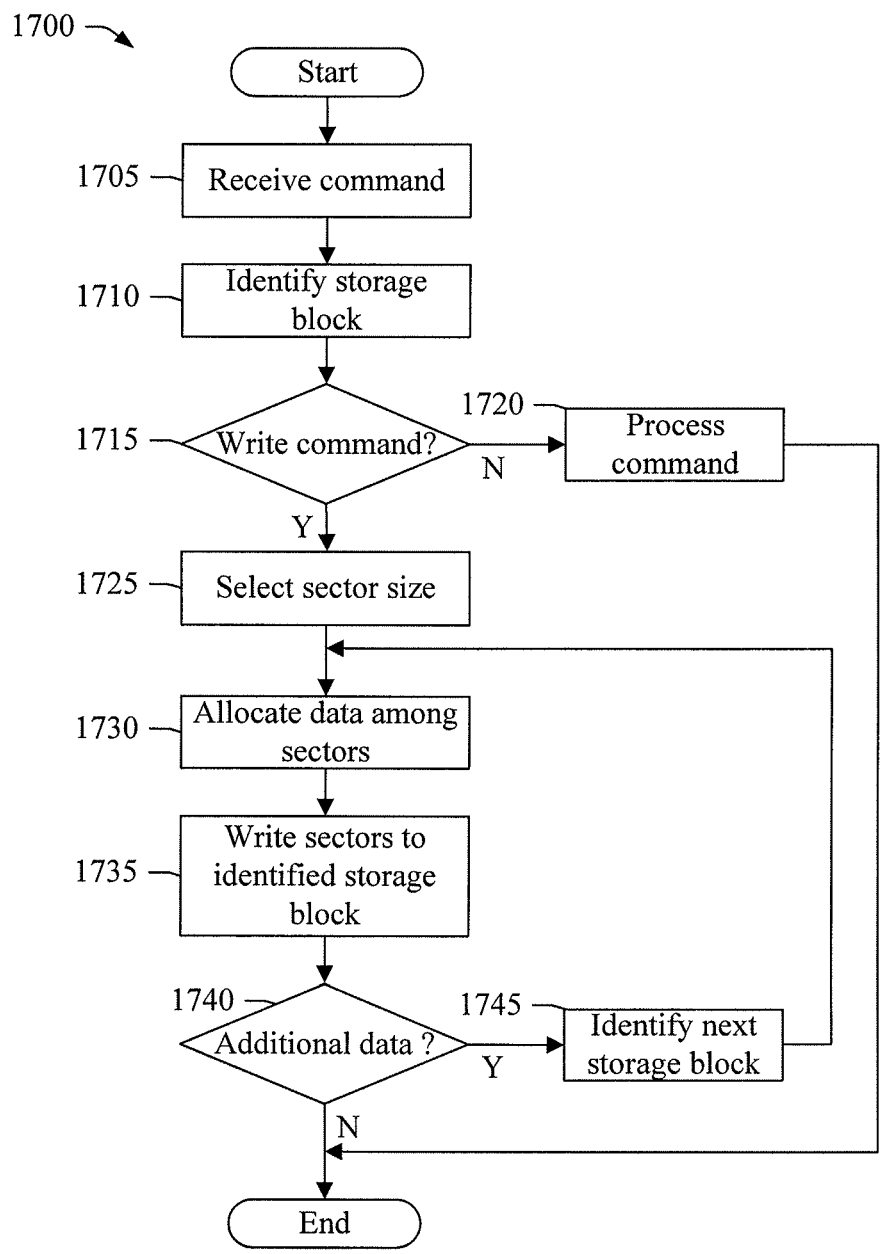
FIG. 17 is a flow chart of a method of transferring data in a flash storage device, in accordance with an embodiment of the present invention.

FIG. 17 illustrates a method 1700 of transferring data in a flash storage device, in accordance with an embodiment of the present invention. In step 1705, a command is received. The command may be a write command or a read command, among others. In one embodiment, the controller 120 receives the command from the host 105 through the host interface 115. The method 1700 then proceeds to step 1710.

In step 1710, a storage block 200 is identified. In one embodiment, the controller 120 identifies the storage block 200 based on the command received from the host 105. For example, the command may include a virtual address and the controller 120 maps the virtual address to a logical block address. The method 1700 then proceeds to step 1715.

In step 1715, a determination is made as to whether the command is a write command. In one embodiment, the controller 120 determines whether the command is a write command based on the command. For example, the command may include data, such as a command identifier or an opcode, and the controller 120 determines whether the command is a write command based on the data. If the controller 120 determines that the command is write command, the method 1700 proceeds to step 1725, otherwise the method 1700 proceeds to step 1720.

In step 1720, arrived at from the determination in step 1715 that the command is not a write command, the command is processed. In one embodiment, the controller 120 processes the command. For example, the command may be a read command and the controller 120 processes the read command by determining a logical block address of the identified storage block 200, reading data from the identified storage block 200, and providing the data to the host 105 through the host interface 115. The method 1700 then ends.

In step 1725, arrived at from the determination in step 1715 that the command is a write command, a sector size is selected. In one embodiment, the controller 120 selects a sector size for data sectors 300 of a page 205. In a further embodiment, the controller 120 also selects a sector size for a system sector 600 of the page 205. In various embodiments, the controller 120 selects the sector for the data sectors 300 or the system sector 600, or both, based on the command, a user input, or an application program. The method 1700 then proceeds to step 1730.

In step 1730, data is allocated among the sectors. In one embodiment, the controller 120 allocates data of the write command among the data sectors 300. In a further embodiment, the controller 120 generates system data 500 based on the data of the write command and allocates the system data 500 among the data sectors 300. In another further embodiment, the controller 120 generates system data 500 based on the data of the write command and allocates the system data 500 to the system sector 600. In still another further embodiment, the controller 120 generates system data 500 based on the data of the write command and allocates the system data 500 among the data sectors 300 and the system sector 600. The method 1700 then proceeds to step 1735.

In step 1735, the sectors are written to the identified storage block 200. In one embodiment, the controller 120 writes the data sectors 300 to the identified storage block 200. In a further embodiment, the controller 120 also writes the system sector 600 to the identified storage block 200. In some embodiments, the controller 120 writes data sectors 300 to the identified storage block 200 until the storage block 200 is full. The method 1700 then proceeds to step 1740.

In step 1740, a determination is made as to whether additional data exists. In one embodiment, the controller 120 determines whether all the data sectors 300 have been written to the identified storage block 200. If the controller 120 determines all the data sectors 300 have not been written to the identified storage block 200, the method 1700 proceeds to step 1745, otherwise the method 1700 ends.

In step 1745, arrived at from the determination in step 1740 that all the data sectors 300 have not been written to the identified storage block 200, a next storage block 200 is identified. In one embodiment, the controller 120 identifies the next storage block 200 for storing remaining data sectors 305 (e.g., data sectors 300 that have not been written to the previously identified storage block 200). For example, the controller 120 may identify the next storage block 200 by identifying the logical block address of the previously identified storage block 200 and incrementing the logical block address. The method 1700 then ends.

In various embodiments, the method 1700 may include more or fewer than the steps 1705-1745 described above and illustrated in FIG. 17. In some embodiments, two or more of the steps 1705-1745 may be performed in parallel. In some embodiments, two or more of the steps 1705-1745 may be performed substantially simultaneously.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method for writing data to a flash storage device, the method comprising:
   receiving a command in connection with user data;
   selecting, in response to the command, a first sector size for an allocation of the user data;
   allocating, by a storage controller, the user data among a plurality of data sectors of the first sector size; and
   writing one or more pages of data comprising the plurality of data sectors to the flash storage device.

2. The method of claim 1, further comprising:
   generating system data based on the user data,
   wherein the system data comprises an error correction code associated with user data allocated to one or more of the data sectors, a logical block address associated with storing the user data, or a time stamp associated with the user data.

3. The method of claim 2, wherein a data sector of the first sector size includes at least a portion of the allocated user data and at least a portion of the system data.

4. The method of claim 2, further comprising:
   selecting a second sector size for an allocation of the system data;
   allocating the system data to at least one system sector of the second sector size; and
   writing the at least one system sector to the storage block with the data sectors.

5. The method of claim 2, wherein the first sector size is selected so that a page size of the one or more pages of data is greater than an integer multiple of the first sector size, the method further comprising:
   allocating the system data to a remaining portion of a page not containing any data sector.

6. The method of claim 2, wherein the first sector size is selected so that a page size of the one or more pages of data is greater than an integer multiple of the first sector size, the method further comprising:
   allocating a portion of the system data among the data sectors of the first sector size and a remaining portion of the system data to a remaining portion of a page not containing any data sector.

7. The method of claim 2, wherein the first sector size associated with storing user data and a sector size associated with storing system data are selected so that an associated page size is equal to a block size of the flash storage device.

8. The method of claim 2, wherein the system data is written to an out-of-bounds area of the flash storage device.

9. The method of claim 1, wherein the first sector size is selected so that a page size of a respective page is an integer multiple of the first sector size.

10. The method of claim 1, further comprising:
    writing a first portion of a data sector to a first storage block of the flash storage device and a remaining portion of the data sector to a second storage block of the flash storage device.

11. The method of claim 1, further comprising:
    identifying a storage block in the flash storage device in response to the command; and
    writing the one or more pages of data to the storage block.

12. The method of claim 1, wherein the sector size is selected based on a command, a user input, or an application program.

13. A system for storing data in a flash storage device, comprising:
    a flash storage; and
    a controller configured to:
      receive a command in connection with user data;
      select a sector size;
      allocate the user data among a plurality of data sectors of the sector size; and
      write one or more pages of data comprising the data sectors to the flash storage.

14. The system of claim 13, wherein the controller is further configured to select the sector size based on an input to the flash storage device.

15. The system of claim 13, wherein the controller is further configured to select the sector size based on the command.

16. The system of claim 13, wherein the flash storage comprises a plurality of storage blocks and the controller is further configured to write the one or more pages of data to more than one storage block of the flash storage.

17. The system of claim 16, wherein each storage block has a block size being an integer multiple of the sector size.

18. The system of claim 16, wherein the controller is further configured to write a first portion of a first data sector to a first storage block and a second portion of the first data sector to a second storage block.

19. The system of claim 18, wherein the system data is allocated to one or more of the data sectors.

20. The system of claim 19, wherein the system data comprises a time stamp, an error correction code, or a logical block address.

21. The system of claim 13, wherein the plurality of data sectors comprises a sector of system data.

22. The system of claim 13, wherein the controller is further configured to:
    read data from the flash storage;
    allocate the data among one or more data sectors of the sector size; and
    provide the data sectors to a host system.

23. A system for storing data in a flash storage device, comprising:
    a flash storage; and
    a controller configured to:
      receive a command comprising data;
      select a sector size;
      allocate the data among one or more sectors of the sector size;
      generate system data for the one or more sectors, wherein the system data is allocated among the one or more sectors of the sector size; and
      write the one or more sectors to one or more storage blocks of the flash storage.

24. The system of claim 23, wherein the controller is further configured to write a first portion of a first data sector to a first storage block and a second portion of the first data sector to a second storage block.

* * * * *